United States Patent [19]

Dangelmaier et al.

[11] 4,162,734
[45] Jul. 31, 1979

[54] ALIGNING AND STACKING ARRANGEMENT

[75] Inventors: Karl Dangelmaier, Göppingen-Holzheim; Alfred Bareis, Uhingen, both of Fed. Rep. of Germany

[73] Assignee: L. Schuler GmbH, Fed. Rep. of Germany

[21] Appl. No.: 855,267

[22] Filed: Nov. 28, 1977

[30] Foreign Application Priority Data

Nov. 27, 1976 [DE] Fed. Rep. of Germany ....... 2653914

[51] Int. Cl.² ................... B65G 57/16; B65H 31/32
[52] U.S. Cl. ............................. 414/27; 29/738; 414/50
[58] Field of Search ............... 214/8, DIG. 1; 29/241, 29/433, 609, 732, 738

[56] References Cited

U.S. PATENT DOCUMENTS

| 2,283,629 | 5/1942 | Heftler | 29/433 |
| 2,964,840 | 12/1960 | Saylor et al. | 214/8 X |
| 3,545,632 | 12/1970 | Cooper | 214/8 |
| 4,046,264 | 9/1977 | Bergmann et al. | 214/8 |
| 4,108,320 | 8/1978 | Bareis et al. | 214/8 |

FOREIGN PATENT DOCUMENTS 347408 8/1960 Switzerland .................. 214/8

Primary Examiner—L. J. Paperner
Attorney, Agent, or Firm—Craig and Antonelli

[57] ABSTRACT

An arrangement for aligning and stacking laminations and for transporting formed stacks of laminations with the laminations being provided with a circular inner and/or outer circumference and having stamped patterns defining a plurality of stampings distributed about the circumference of the laminations at equal centering angles. A stack forming device is provided for receiving laminations fed individually thereto with the stack forming device including at least two stack forming elements mounted so as to be selectively separable. The stack forming elements are disposed one above the other in a longitudinal direction of the stack forming device so as to form upper and lower stack forming elements. The lower stack forming element selectively engages the upper stack forming element, with such element being maintained in a fixed position when the lower stack forming element is displaced to a lowered position. A drive arrangement is provided for rotating only the lower stack forming element through stepwise predetermined increments when the lower stack forming element is in the lowered position with the predetermined increments constituting a whole number multiple of the central angle of the stampings and being equal to one of 90°, 120° or 180°.

7 Claims, 3 Drawing Figures

ALIGNING AND STACKING ARRANGEMENT

The present invention relates to an alignment and stacking arrangement and, more particularly, to an alignment and stacking arrangement for aligning and stacking laminations for electrical equipment with the laminations being manufactured during a continuous stamping operation wherein the laminations are individually fed in the same position to a stack former which maintains the relative position of the respective laminations by way of guide means.

An aligning and stacking device is proposed, for example, in German Auslegeschrift No. 1,110,118 wherein stacks of E-shaped laminations for magnetic cores of transformers or similar laminations are aligned only in one specific position determined by a stamping process with a plurality of ridges, disposed on various sides of the stack to be formed, constituting a guide of the stack former for determining the relative positions of the laminations.

While this proposed device operates satisfactorily for alignment and stacking of laminations which can be aligned and stacked in only a single position, if alignment and stacking of laminations with a circular inner and/or outer circumference is involved, which laminations have a stamped form including a plurality of stampings, for example, grooves equi-angularly distributed about the periphery of the laminations, an alignment of the stack as it is formed is not possible, but rather each lamination or a plurality of successive laminations can be stacked only after being rotated by a central angle relative to a previous lamination or a plurality of successive laminations with the central angle being equal to the central angle of the stampings of the stamped form or a whole number multiple thereof.

In the production of a stack of laminations, in order to economically manufacture the same, it is necessary to take into account inhomogeneities in the material and also variations in the thickness of the individual laminations which form the stack. For this purpose, a device for aligning plates is proposed in U.S. Pat. No. 3,823,460, wherein a ring member is provided having a mandrel located in an opening of the member with the mandrel being provided with a plurality of registering elements operative in an alternating manner between an operating position and a rest position whereby each blank received by the apparatus is rotated in its plane and with respect to a preceding blank so that the blanks, when superimposed, form a stack having a rectangular cross-section.

Along the same lines, a further aligning and stacking device is proposed in commonly assigned U.S. patent application Ser. No. 776,940, now U.S. Pat. No. 4,108,320, the disclosure of which is incorporated herein by reference to the extent necessary in understanding the present invention, wherein a stack former is provided which has an appropriate circular configuration and guide means which can be introduced into at least one stamping with the stack former being rotatably mounted relative to its axis by a stepwise operating rotary drive, the steps of which are equal to a central angle of the stamping pattern or a whole number multiple thereof. By virtue of this arrangement, the varying thickness of the individual laminations which may occur in a normal stamping operation throughout the height of the stack is taken into account and also a stack of laminations is produced with a predetermined orientation of non-circular outer contours of laminations with a circular inner circumference from one lamination to the next and throughout the height of the stack of laminations.

Stack formers for stacking laminations with a circular inner and/or outer circumference constructed as mandrels with circular outer circumference or tubes with circular inner circumference have been proposed, for example, in British Pat. No. 1,307,961 and VDI Guideline 3246, March, 1965, page 25, FIG. 105; however, such proposed devices themselves cannot be employed in solving the problems to which the present invention is addressed, nor are such devices suitable therefor.

To feed the individual laminations in the same position to a stack former, the stack former may be disposed vertically beneath a matrix of a punch die in a manner disclosed, for example, in the aforementioned German Auslegeschrift No. 1,110,118 and disposed below a delivery end of a horizontal conveyor in a manner described, for example, in German Auslegeschrift No. 2,019,661, thereby ensuring that the laminations reach the horizontal conveyor in the same position, are maintained in such position on the horizontal conveyor during their transport, and are delivered at the delivery end of the horizontal conveyor individually in such position.

The aim underlying the present invention essentially resides in providing an alignment and stacking arrangement whereby individual laminations constituting an intermediate stack in their entirety can be stacked in a stack former which has been rotated by a rotary step which constitutes a whole number multiple of a central angle of the stampings of the stamped form with the rotary step being executed relative to a previous entirety or stack of laminations which have formed an intermediate stack.

The underlying problems are solved in accordance with the present invention by providing a stack former and an intermediate stacking device which is non-rotatably mounted on an upper part of the stack former with the upper part being gripped by the intermediate stacking device during the formation of an intermediate stack and with a rotary drive operating in a stepwise manner engaging only a lower part of the stack former.

According to the present invention, the stack former is provided with an appropriate circular configuration and guide means which can be introduced into at least one stamping with the guide means being constructed as guide ridges or ribs disposed on an outer circumference of a mandrel or mandrels or an inner circumference of a tube or tubes which constitute the stack former if the stamping laminations are made in the form of grooves which extend from the circular inner and outer circumference.

The stack former of the present invention may be mounted beyond a cutting shear at which the laminations, previously stamped in a continuous stamping operation out of a strip of lamination material, are separated from the strip of material with the cut laminations each being in the same position and falling directly on the stack former.

Advantageously, the stack former is constructed of two stacking members which are mounted one above the other in axial alignment with the two stacking members being selectively separable so that one of the stacking members forms an intermediate stack, while the laminations formed on the other stacking member are removed from the stack former. By virtue of this arrangement, it is possible to align and stack laminations during a continuous stamping operation.

To facilitate the formation of an intermediate stack at the stacking member, stacking or holding elements are selectively displaceable into and out of a stacking area so as to selectively grip the upper stacking member in a manner more fully disclosed in the afore-mentioned U.S. patent application Ser. No. 776,940, now U.S. Pat. No. 4,108,320. The stacking or holding elements engage portions of the upper stacking member so as to grip and hold the same in a given position.

According to the present invention, when the stacking and holding elements engage the upper stacking member, the laminations are deposited on the upper stacking member in mutually identical positions. During this stacking, the lower stacking member can be rotated by a central angle about which the new intermediate stack is to be deposited on the lower stacking member.

If a whole stack of laminations is formed on the lower stacking member of the stack former, according to the present invention, during the formation of an intermediate stack at the upper stacking member, the lower stacking member of the stack former is displaced to a position whereat the stack of laminations on the lower stacking member is removed to a conveying means and the lower stacking member is then displaced so as to engage the upper stacking member and receive therefrom the laminations stacked thereon during the lowering and raising of the lower stacking member. For example, a cylinder and piston unit actuable by a pressure medium may be provided for raising and lowering the lower stacking member of the stack former.

In accordance with the present invention, the upper stacking member of the stack former remains constantly in the same angular position and only the lower stacking member of the stack former is rotated. For this purpose, a guide ring is provided which cooperates with a support bushing operatively connected with the lower stacking member. For the purposes of providing a driving connection between the guide ring and support bushing, the guide ring is provided with a vertical groove on an inner periphery thereof and the support bushing is provided with a vertical strip on its outer periphery, which strip is guided in the groove as the support bushing is lowered when the lower stacking member is displaced to the position wherein the stack of laminations formed thereon is delivered to the conveying means.

Preferably, according to the present invention, the rotary drive of the lower stacking member of the stack former is displaced each time through a central angle of 90°, 120° or 180°. With a rotary displacement for a central angle of 180°, an especially simple rotary drive may be provided in accordance with the present invention with only two fixed preset angular positions. For example, a cylinder and piston unit actuable by a pressure medium may be provided as the rotary drive with the piston rod of the cylinder and piston unit being provided with a section in the form of a rack of gear teeth with the teeth of the rack meshing with a pinion operatively connected with the lower stacking member of the stack former.

Accordingly, it is an object of the present invention to provide an aligning and stacking arrangement for laminations manufactured in a continuous stamping operation which avoids by simple means drawbacks and shortcomings encountered in the prior art.

A further object of the present invention resides in providing an aligning and stacking arrangement for laminations which ensures an accurate aligning and stacking of laminations provided with circular inner and/or outer circumference under all operating conditions.

Another object of the present invention resides in providing an aligning and stacking arrangement for laminations which produces a stack which takes into account any variation in thickness of the individual laminations which occurs in a normal stamping operation.

A still further object of the present invention resides in providing an aligning and stacking arrangement for laminations which ensures a predetermined orientation of non-circular outer contours of the laminations with a circular inner circumference from one intermediate stack of laminations to a next intermediate stack of laminations.

An additional object of the present invention resides in providing an aligning and stacking arrangement for laminations of, for example, electrical equipment, which is relatively simple in construction and, therefore, relatively inexpensive to manufacture.

Yet another object of the present invention resides in providing an aligning and stacking arrangement for laminations which employs simple means to convey aligned and stacked entireties of the laminations into the stack with the laminations having been rotated relative to a following similar entirety and with the entireties being sequential, constituting an intermediate stack with a predeterminable number of laminations, in a mutually equivalent position, based on the initial position, whereby a simplified compensation is realized for inhomogeneities in the material of the laminations.

A still further object of the present invention resides in providing an aligning and stacking arrangement for laminations wherein, during the formation of a stack of laminations on a non-rotatably mounted intermediate stacking member, a lower stacking member of a stack former executes a rotary step by way of a rotary drive.

These and other objects, features and advantages of the present invention will become more apparent from the following description when taken in connection with the accompanying drawings which show, for the purposes of illustration only, one embodiment in accordance with the present invention, and wherein.

Figure 1:
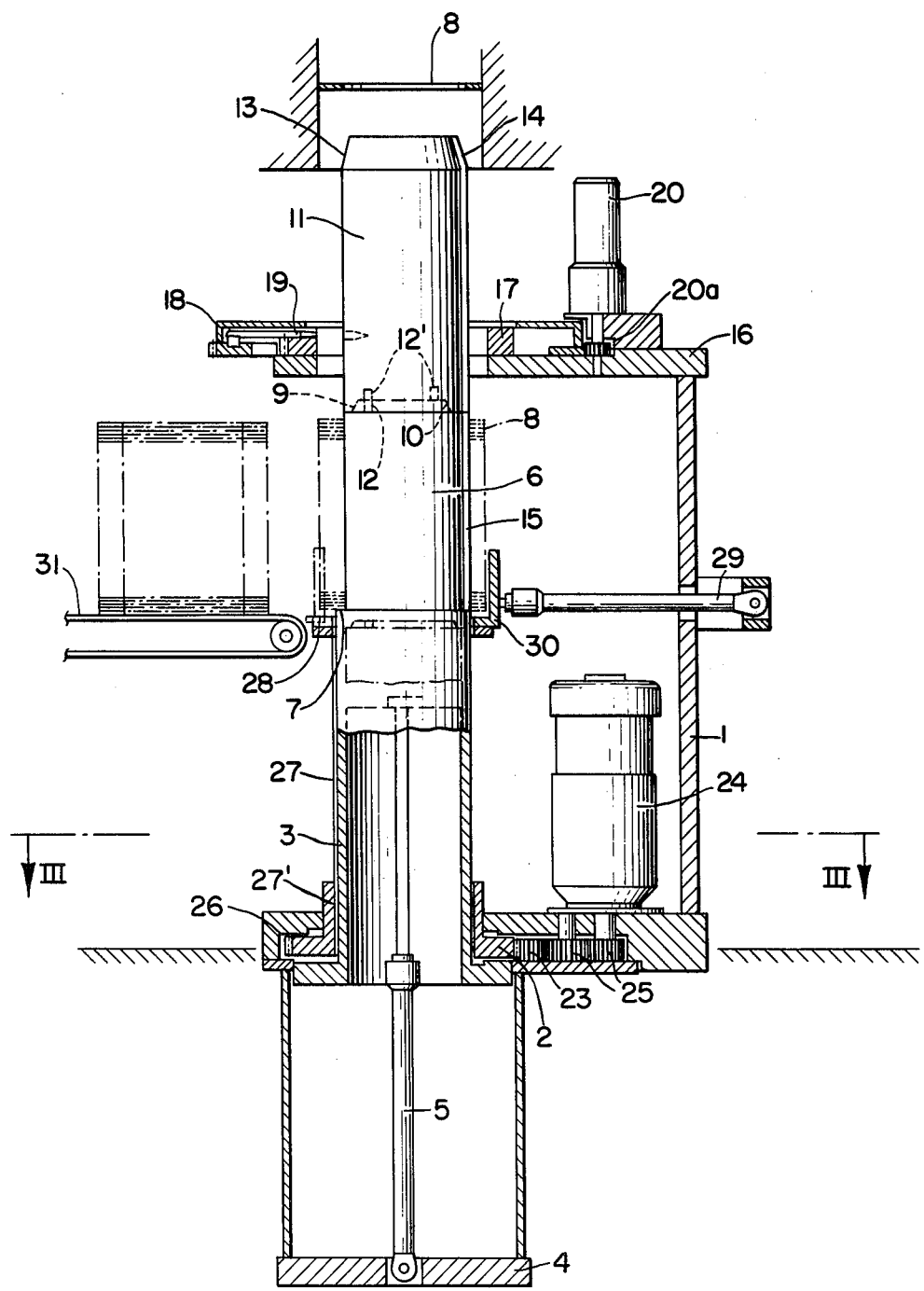
FIG. 1 is a vertical partial cross-sectional view through a lamination aligning and stacking arrangement in accordance with the present invention.

Referring now to the drawings wherein like reference numerals are used throughout the various views to designate like parts and, more particularly, to FIG. 1, according to this figure, a guide ring 2 is rotatably mounted in a frame with a support bushing 3 being guided displaceably in the guide ring 2. A pressure medium actuated cylinder piston unit 5 is connected to one side of the support bushing 3 and on the other side to a lower cross brace 4 of a frame 1. The cylinder piston unit 5 is selectively connectable in a conventional manner with a pressure medium source (not shown) so as to permit a selective raising and lowering of the support bushing 3. A stack former is provided which includes a mandrel consisting of a lower mandrel element 6 and an upper mandrel element 11 with the lower mandrel element 6 being mounted on the upper end of the support bushing 3 so as to form an upwardly directed annular step 7 at the junction between the support bushing 3 and lower end of the mandrel element 6 with laminations 8 being brought into engagement and resting on the step 7 during a stacking operation. The upper mandrel element 11 is mounted on the mandrel element 6 by way of cooperating upwardly tapering conical sections 9, 10 provided on the lower end of the mandrel element 11 and the upper end of the mandrel element 6, respectively.

Centering bores 12 are provided on the upper surface of the lower mandrel element 6 for receiving a centering pin 12' disposed in the lower end of the upper mandrel element 11. The number and disposition of the centering bores 12 at the lower mandrel element 6 depend upon the rotary steps through which the lower mandrel element is driven. Thus, if the lower mandrel element 6 is driven in increments of 90°, four centering bores 12 would be provided; whereas, with rotary increments of 180° and 120°, two and three centering bores 12 would be provided, respectively.

An upwardly tapering cone 13 is provided on the upper end of the mandrel element 11 for threading the supplied laminations 8 onto the mandrel element 11. At least one vertically extending guide rib or ridge 14, 15 is provided on the outer circumference of each of the mandrel elements 11, 6, respectively, with the guide ribs or ridges 14, 15 being brought into vertical alignment with one another when the mandrel elements 6, 11 are connected together by way of the conical sections 9, 10, the corresponding support surfaces and the engagement of the centering pin 12' in one of the centering bores 12.

A ring member 17 is provided and fixedly mounted at an upper plate 16 provided on the frame 1. An outer ring 18, relatively rotatable with respect to the inner ring 17, is also mounted at the upper plate 16. The rings 17, 18 at the upper plate 16 define an intermediate stacking area for the laminations 8. The ring 17 is provided with an opening for permitting the passage of laminations 8 therethrough. Radially displaceable pins 19 are mounted in radially extending bores provided in the inner ring 17 with the pins 19 being insertable into corresponding radial holes provided at the upper mandrel element 11.

Figure 2:
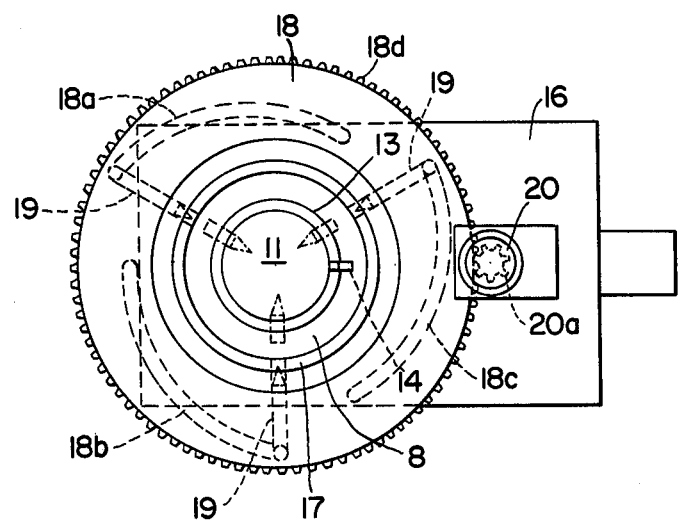
FIG. 2 is a top view of the lamination aligning and stacking arrangement of FIG. 1.

A radial displacement of the pins 19 in the bores of the ring 17 is effected by rotating the outer ring 18 relative to the inner ring 17. For this purpose, as shown most clearly in FIG. 2, the outer ends of the pins 19 are guided by links and cam surfaces 18a, 18b, 18c provided in the outer ring 18 with the radial distances of the cam surfaces 18a–18c from the axis of the mandrel element 11 changing between the two ends by a degree of displacement of the pins 19. A drive means 20 has a drive gear 20a arranged on a drive shaft thereof which engages with gear teeth 18d of the outer ring 18 so as to cause a relative rotation of the outer ring with respect to the inner ring 17, whereby the pins 19 are selectively displaced into and out of engagement with the upper mandrel element 11.

As shown in FIG. 1, the guide ring 2 is provided on an outer circumference thereof with a vertically extending rib or projection 27 which is received in a groove 27' provided on an inner surface of the support bushing 3. The vertically extending rib or projection 27 and groove 27' form a drive connection between the guide ring 2 and the support bushing 3. The rib or projection 27 extends along substantially the entire axial length of the support bushing 3 so that when the support bushing 3 is lowered and therewith the lower mandrel element 6 by the cylinder piston unit 5, the driving engagement between the ring 2 and the support bushing 3 is maintained.

When the support bushing 3 together with the lower mandrel element 6 are displaced to the lower end position by the cylinder piston unit 5, the stack consisting of laminations 8 rests on a support surface 28 which is integral with the frame 1 and the stack of laminations 8 can then be shifted onto a horizontal conveyor 31 by a horizontally operating pusher plate 30 driven by a pressure medium actuated cylinder piston unit 29 mounted at the frame 1. When the support bushing 3 along with the lower mandrel element 6 is raised to the upper end position by the cylinder piston unit 5, the centering pin 12' will enter an appropriate centering bore 12 so that both the mandrel elements 6 and 11 of the stack former are maintained in an aligned position. In the upper end position of the support bushing 3, the pins 19 are disposed in their radially outwardly displaced end position out of engagement with the blind holes in the mandrel element 11 so that the pins are ineffective to form an intermediate stack of laminations, whereby the laminations are then stacked on the lower mandrel element 6.

Figure 3:
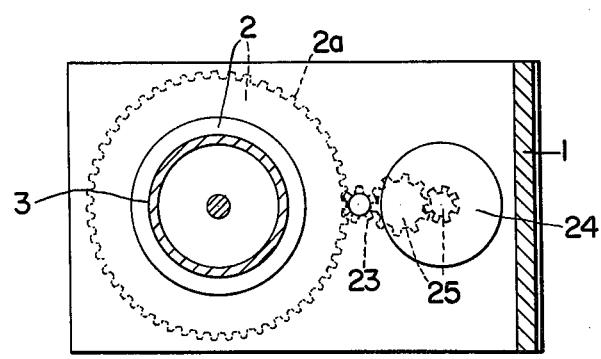
FIG. 3 is a cross-sectional view taken along the line III—III of FIG. 1.

As shown in FIG. 3, a rotary drive means is provided which includes a drive gear or drive connection 25 and a drive motor 24 which cause a selective driving of the ring 2 and support bushing 3 by way of an idler gear 23. As readily apparent, if desired, the idler gear 23 could be eliminated by virtue of providing a larger diameter drive gear 25.

In operation, stamped laminations 8 are fed or conveyed in mutually identical positions to the stack former, i.e., upper and lower mandrel elements 11, 6. With the pins 19 in the retracted position shown in FIG. 1, the individual laminations are guided to the lower mandrel element 6 with the first lamination resting on the step 7. Upon a predetermined number of laminations being stacked on the lower mandrel element 6, the drive motor 20 is actuated so as to cause a rotary displacement of the rotary ring 18 which, in turn, displaces the pins 19 radially inwardly so as to engage the blind holes in the upper mandrel element 11, thereby holding the upper mandrel element 11 in a fixed or constant position.

With the pins 19 being displaced radially inwardly, the laminations 8 form an intermediate stack on the upper mandrel element 11 while the cylinder and piston unit 5 lowers the support bushing 3 and lower mandrel element 6 to a position wherein the supporting surfaces of the upper and lower mandrel elements 11, 6 are out of engagement and the centering pin 12' is displaced out of the associated centering bore 12. The drive motor 24 then drives the ring 2, support bushing 3 and lower mandrel element 6 through a rotary movement of 90°, 120° or 180°, while an intermediate stack of laminations 8 continues to be formed at the upper mandrel element 11.

Upon a completion of the rotary incremental movement of the lower mandrel element 6, the cylinder and piston unit 5 raises the lower mandrel element 6 until the supporting surfaces of the upper and lower mandrel elements 11, 6 are in engagement with the centering pin 12' engaging in another centering bore 12, whereupon the drive motor 20 is again actuated so as to withdraw the pins 19, whereby the intermediate stack of laminations formed at the upper mandrel element 11 is then fed or conveyed to the lower mandrel element 6. By virtue of the rotary displacement of the lower mandrel element 6 during the formation of the intermediate stack of laminations 8, the first stack of laminations 8 and the intermediate stack are shifted by the amount of the incremental rotation, that is, by 90°, 120° or 180°.

Upon a further predetermined number of laminations being formed at the lower mandrel element 6, the above lowering and rotating procedure is again carried out with a further intermediate stack then being formed at the upper mandrel element 11, which further intermediate stack, when fed or conveyed to the lower mandrel element, will also be shifted by the amount of the further incremental rotation of the lower mandrel element 6.

When the lower mandrel element 6 has been filled with the laminations 8, the cylinder and piston unit 5 lowers the lower mandrel element 6 to a position clear of the formed stack of laminations 8 so as to permit the pusher 30 to displace the stack of laminations to the horizontal conveyor 31. During the lowering process of the lower mandrel element 6, an intermediate stack is continuously formed at the upper mandrel element 11 so that upon the raising of the lower mandrel element 6 following a displacement of the completed stack of laminations to the horizontal conveyor 31, the intermediate stack will then be conveyed or fed to the raised lower mandrel element 6.

The stack former may also be constructed of upper and lower tubular members having a circular inner circumference for stacking laminations with a circular outer circumference. The inner circumference of the tube may be provided with at least one guide ridge or rib for engaging groove-shaped stampings extending out from the circular outer circumference of the laminations 8. In such construction, the stack former which surrounds the intermediate stacking area and the pins 19 would be selectively displaceable into and out of holes or bores provided in the upper tubular member. As readily apparent, with the pins 19 being displaced into the holes in the upper tubular member, laminations dropping into the tubular member would come to rest on the projecting pins 19 so as to form an intermediate stack in the upper tubular member while the lower tubular member is displaced to a lower end position so as to permit incremental rotation thereof.

While we have shown and described one embodiment in accordance with the present invention, it is understood that the same is not limited thereto, but is susceptible of numerous changes and modifications as known to a person skilled in the art, and we therefor do not wish to be restricted to the details shown and described herein, but intend to cover all such modifications as are encompassed by the scope of the appended claims.

We claim:

1. An arrangement for aligning and stacking laminations and for transporting formed stacks of laminations, the laminations being provided with a circular inner and/or outer circumference and having stamped patterns defining a plurality of stampings distributed about the circumference of the laminations at equal centering angles, the arrangement comprising:

a stack forming means for receiving laminations fed individually thereto including at least two stack forming elements mounted so as to be selectively separable, said stack forming elements being disposed one above the other in a longitudinal direction of the stack forming means so as to form an upper stack forming element and a lower stack forming element, means selectively displaceable into and out of an intermediate stack forming area which surrounds the stack forming means at least in an area of the upper stack forming element for selectively engaging said upper stack forming element so as to maintain said upper stack forming element in a fixed position when said lower stack forming element is displaced to a lowered position and for forming an intermediate stack of laminations including a first ring member rotatably mounted at the intermediate stack forming area, a second ring member fixedly mounted at the intermediate stack forming area, means for selectively rotating said first ring member relative to said second ring member, a plurality of intermediate stack forming members displaceably mounted in said second ring member for a radial displacement, and means arranged at said first and second ring members for causing a displacement of the intermediate stack forming members upon a rotation of said first ring member, and means for rotating only said lower stack forming element through stepwise predetermined increments when said lower stack forming element is in the lowered position with the predetermined increments being constituted by a whole number multiple of the central angle of the stampings.

2. An arrangement according to claim 1, wherein the predetermined increments constituting a whole number multiple of the central angle in equal to one of 90°, 120°, or 180°.

3. An arrangement according to claim 1, wherein said means for selectively raising and lowering said lower stack forming element includes a support bushing operatively connected with the lower stack forming element, and wherein said means for rotating only said lower stack forming element include a gear ring, means for operatively connecting said gear ring with said support bushing, and a drive means operatively connected with the gear ring so as to selectively rotate the gear ring through the stepwise predetermined increments.

4. An arrangement according to claim 3, wherein said means for connecting the gear ring with the support bushing include a longitudinally extending projection provided on one of the outer surface of the support bushing and the inner surface of the gear ring and a groove means provided on the other of the outer surface of the support bushing and the inner surface of the gear ring for receiving said projection.

5. An arrangement according to claim 3, wherein the predetermined increments constituting a whole number multiple of the central angle is equal to one of 90°, 120°, or 180°.

6. An arrangement according to claim 3, wherein said means for connecting the gear ring with the support bushing include a longitudinally extending projection provided on the outer surface of the support bushing and a groove means provided on the inner surface of the gear ring for receiving said projection.

7. An arrangement according to claim 3, wherein said means for connecting the gear ring with the support bushing include a longitudinally extending groove means provided on the outer surface of the support bushing and a projection provided on the inner surface of the gear ring for being received by said groove means.

* * * * *